United States Patent
Ohata et al.

(10) Patent No.: US 7,816,038 B2
(45) Date of Patent: Oct. 19, 2010

(54) LITHIUM ION SECONDARY BATTERY AND METHOD FOR PRODUCING THE SAME

(75) Inventors: Tsumoru Ohata, Kyoto (JP); Junji Nakajima, Osaka (JP); Tetsuya Hayashi, Osaka (JP); Shigeo Ikuta, Kagoshima (JP); Akiko Fujino, Osaka (JP); Eitaro Nakamura, Tokyo (JP)

(73) Assignee: Panasonic Corporation, Osaka (JP)

( * ) Notice: Subject to any disclaimer, the term of this patent is extended or adjusted under 35 U.S.C. 154(b) by 756 days.

(21) Appl. No.: 11/578,964

(22) PCT Filed: Apr. 19, 2005

(86) PCT No.: PCT/JP2005/007462

§ 371 (c)(1),
(2), (4) Date: Jun. 22, 2007

(87) PCT Pub. No.: WO2005/104270

PCT Pub. Date: Nov. 3, 2005

(65) Prior Publication Data

US 2008/0038639 A1    Feb. 14, 2008

(30) Foreign Application Priority Data

Apr. 19, 2004    (JP) .............................. 2004-122893

(51) Int. Cl.
*H01M 4/04*    (2006.01)
*H01M 4/62*    (2006.01)

(52) U.S. Cl. ................................. 429/231.95; 29/623.5

(58) Field of Classification Search ............. 429/231.95
See application file for complete search history.

(56) References Cited

U.S. PATENT DOCUMENTS 5,846,674 A    12/1998    Sakai et al.
(Continued)

FOREIGN PATENT DOCUMENTS

GB    1 328 905    9/1973
(Continued)

OTHER PUBLICATIONS

Korean Office Action issued in Korean Patent Application No. KR 10-2006-7024023, mailed Sep. 27, 2007.
(Continued)

*Primary Examiner*—Patrick Ryan
*Assistant Examiner*—Brent Thomas
(74) *Attorney, Agent, or Firm*—McDermott Will & Emery LLP

(57) ABSTRACT

A method for producing a lithium ion secondary battery includes the steps of: forming a positive electrode mixture layer on a positive electrode substrate to obtain a positive electrode; forming a negative electrode mixture layer on a negative electrode substrate to obtain a negative electrode; forming an electronically insulating porous film that is bonded to a surface of at least one of the positive electrode and the negative electrode; interposing a separator between the positive electrode and the negative electrode to form an electrode plate assembly; and impregnating the electrode plate assembly with a non-aqueous electrolyte. The step of forming a porous film includes the steps of: preparing a porous film paste that contains a film binder comprising a thermo-cross-linkable resin and a particulate filler; and applying the porous film paste onto a surface of at least one of the positive electrode and the negative electrode and heating the resultant applied film.

4 Claims, 1 Drawing Sheet

U.S. PATENT DOCUMENTS

| | | | |
|---|---|---|---|
| 6,387,570 B1 * | 5/2002 | Nakamura et al. | 429/300 |
| 6,632,561 B1 | 10/2003 | Bauer et al. | |
| 6,855,458 B1 | 2/2005 | Kim et al. | |
| 2002/0114993 A1 | 8/2002 | Miyaki et al. | |
| 2002/0187402 A1 * | 12/2002 | Hataya | 429/306 |
| 2004/0029014 A1 | 2/2004 | Hwang et al. | |
| 2004/0053123 A1 * | 3/2004 | Chang et al. | 429/144 |
| 2008/0044733 A1 * | 2/2008 | Ohata et al. | 429/326 |

FOREIGN PATENT DOCUMENTS

| | | |
|---|---|---|
| JP | 7-220759 A | 8/1995 |
| JP | 9-190814 A | 7/1997 |
| JP | 10-334877 A | 12/1998 |
| JP | 11-97027 A | 4/1999 |
| JP | 11-288741 A | 10/1999 |
| JP | 2003-208891 A | 7/2003 |
| KR | 2001-0008488 | 2/2001 |
| KR | 10-2004-0013585 | 2/2004 |
| WO | WO 97/01870 A1 | 1/1997 |

OTHER PUBLICATIONS

European Search Report issued in European Patent Application No. 05734740.3, mailed Jul. 23, 2009.

* cited by examiner

LITHIUM ION SECONDARY BATTERY AND METHOD FOR PRODUCING THE SAME

RELATED APPLICATIONS

This application is the U.S. National Phase under 35 U.S.C. §371 of International Application No. PCT/JP2005/007462, filed on Apr. 19, 2005, which in turn claims the benefit of Japanese Application No. 2004-122893, filed on Apr. 19, 2004, the disclosures of which Applications are incorporated by reference herein.

TECHNICAL FIELD

The present invention relates to a lithium ion secondary battery and a method for producing the same, and, mainly, to a method for easily producing a lithium ion secondary battery with excellent life characteristics.

BACKGROUND ART

Lithium ion secondary batteries generally include: a positive electrode comprising a positive electrode substrate and a positive electrode material mixture layer carried thereon; a negative electrode comprising a negative electrode substrate and a negative electrode material mixture layer carried thereon; a separator; and a non-aqueous electrolyte. The electrode material mixture layer comprises an active material and an electrode binder, and the electrode binder is usually a thermoplastic resin, a modified rubber material, or the like. Specifically, first, an electrode mixture slurry is prepared by mixing an active material, an electrode binder, and a dispersion medium of the active material. The electrode mixture slurry is applied onto an electrode substrate, dried with hot air at 130° C. or lower, and roll pressed, to form an electrode material mixture layer (see Patent Document 1).

The separator interposed between the positive electrode and the negative electrode has functions of electronically insulating the electrode plates and retaining the electrolyte. The separator is mainly a microporous sheet composed of polyethylene resin. However, such a separator sheet as a microporous sheet is generally subject to shrinking even at temperatures of 150° C. or lower, thereby causing the battery to short-circuit. Also, when a sharp object such as a nail penetrates the battery (for example, upon nail penetration test), heat is instantaneously produced due to a short-circuit reaction, thereby causing the microporous sheet to shrink, which results in expansion of the short-circuit.

Recently, in order to improve quality, it has been proposed to bond a porous film, made of a particulate filler and a film binder, to the surface of an electrode in order to use the electrode integrated with the porous film. In this case, first, a porous film paste is prepared by mixing a particulate filler, a film binder, and a dispersion medium of the particulate filler. The porous film paste is applied onto the electrode surface and dried with hot air (see Patent Document 2).

The film binder that has been conventionally used is a resin that dissolves or disperses in the above-mentioned dispersion medium. The applied film of the porous film paste is dried with hot air to evaporate the dispersion medium, in order to form a porous film. However, such a porous film obtained in the above manner has poor strength, and swelling with an electrolyte and dissolution into the electrolyte of the film binder tend to occur. Also, such a porous film may separate from the electrode surface when it is subjected to stress exerted by expansion and contraction of the electrode active material. These phenomena are believed to cause degradation of life characteristics of lithium ion secondary batteries.

Patent Document 1: Japanese Laid-Open Patent Publication No. Hei 10-334877

Patent Document 2: Japanese Laid-Open Patent Publication No. Hei 7-220759

DISCLOSURE OF INVENTION

Problem that the Invention is to Solve

The use of a film binder with low affinity for an electrolyte is believed to be effective for suppressing swelling of the porous film with the electrolyte and dissolution of the film binder into the electrolyte. However, such a film binder is unlikely to uniformly disperse or dissolve in the dispersion medium used for preparing a porous film paste. Hence, a homogeneous paste cannot be obtained and it is difficult to form a good porous film.

The porous film is a thin film formed on an electrode surface. It usually has a thickness of only 2 to 10 μm and inherently has poor strength. Thus, the degree of homogeneity of the porous film paste has a large effect on the strength of the porous film, and when a film binder with low affinity for an electrolyte is used to form a porous film, it is difficult for the porous film to have certain strength stably immediately after the formation thereof on the electrode surface.

That is, to ensure affinity between the film binder and the dispersion medium in the process of preparing the porous film paste and to suppress the swelling of the porous film with the electrolyte and the dissolution of the film binder into the electrolyte in the battery are not mutually compatible. It is therefore an object of the present invention to realize such effects which are mutually incompatible.

Means for Solving the Problem

The present invention relates to a method for producing a lithium ion secondary battery, including the steps of: forming a positive electrode material mixture layer on a positive electrode substrate to obtain a positive electrode; forming a negative electrode material mixture layer on a negative electrode substrate to obtain a negative electrode; forming an electronically insulating porous film that is bonded to a surface of at least one of the positive electrode and the negative electrode; interposing a separator between the positive electrode and the negative electrode to form an electrode plate assembly; and impregnating the electrode plate assembly with a non-aqueous electrolyte. The step of forming a porous film includes the steps of: preparing a porous film paste that contains a film binder comprising a thermo-cross-linkable resin and a particulate filler; and applying the porous film paste onto a surface of at least one of the positive electrode and the negative electrode and heating the resultant applied film.

It is preferred that the thermo-cross-linkable resin be, for example, a single-liquid-type resin with a masked cross-linkable site.

The thermo-cross-linkable resin may be, for example, a copolymer having an acrylonitrile unit, a copolymer having a polyacrylonitrile chain, or a polyacrylonitrile derivative.

The masked cross-linkable site is desirably activated, for example, at 100° C. or higher, and more desirably at 150° C. or higher. As used herein, "activated" refers to a state in which, for example, more than 95% of cross-linking reaction proceeds.

The temperature condition under which the applied film is heated to cause cross-linking to proceed is desirably heating at temperatures of, for example, 150° C. or higher, and more desirably 190° C. or higher, for 1 hour or more. Since the porous film paste contains a dispersion medium, it is desirable to dry the applied film of the porous film paste at 130° C. or lower for a short time, for example, for several minutes before heating the applied film to cause cross-linking to proceed.

The step of heating the applied film is preferably performed in an inert gas.

The present invention also relates to a lithium ion secondary battery including: a positive electrode comprising a positive electrode substrate and a positive electrode material mixture layer carried thereon; a negative electrode comprising a negative electrode substrate and a negative electrode material mixture layer carried thereon; an electronically insulating porous film bonded to a surface of at least one of the positive electrode and the negative electrode; and a non-aqueous electrolyte. The porous film comprises a particulate filler and a film binder, and the film binder comprises a cured thermo-cross-linkable resin.

When the cured resin is immersed in the non-aqueous electrolyte at 60° C. for 72 hours, the cured resin preferably swells with the non-aqueous electrolyte by 700% or less.

It is preferred that the non-aqueous electrolyte comprise a non-aqueous solvent and a lithium salt dissolved in the non-aqueous solvent and that the non-aqueous solvent comprise a carbonic acid ester.

Effects of the Invention

The film binder comprising a thermo-cross-linkable resin can be uniformly dissolved or dispersed in the dispersion medium of the porous film paste before the cross-linking proceeds. However, after the cross-linking has proceeded, the resistance to the electrolyte is significantly improved, so that swelling of the porous film with the electrolyte or dissolution of the film binder into the electrolyte are unlikely to occur. That is, to ensure affinity between the film binder and the dispersion medium in the process of preparing the porous film paste and to suppress the swelling of the porous film with the electrolyte and the dissolution of the film binder into the electrolyte in the battery become mutually compatible. A lithium ion secondary battery having such a porous film has excellent life characteristics.

Also, by using a thermo-cross-linkable resin that causes a cross-linking reaction by itself when the temperature rises to a certain temperature as the film binder of the porous film, it is possible to suppress changes in physical properties of the porous film paste, which frequently occur in the case of using a cross-linking agent or the like. That is, the use of a thermo-cross-linkable resin permits easy control of the intended cross-linking reaction. Thermo-cross-linkable resins are stable unless they are heated to predetermined temperatures. Hence, when the porous film paste is stored at about room temperature, the viscosity of the paste is unlikely to change. Therefore, the porous film paste can be handled in the same manner as a conventional film binder.

BEST MODE FOR CARRYING OUT THE INVENTION

Figure 1:
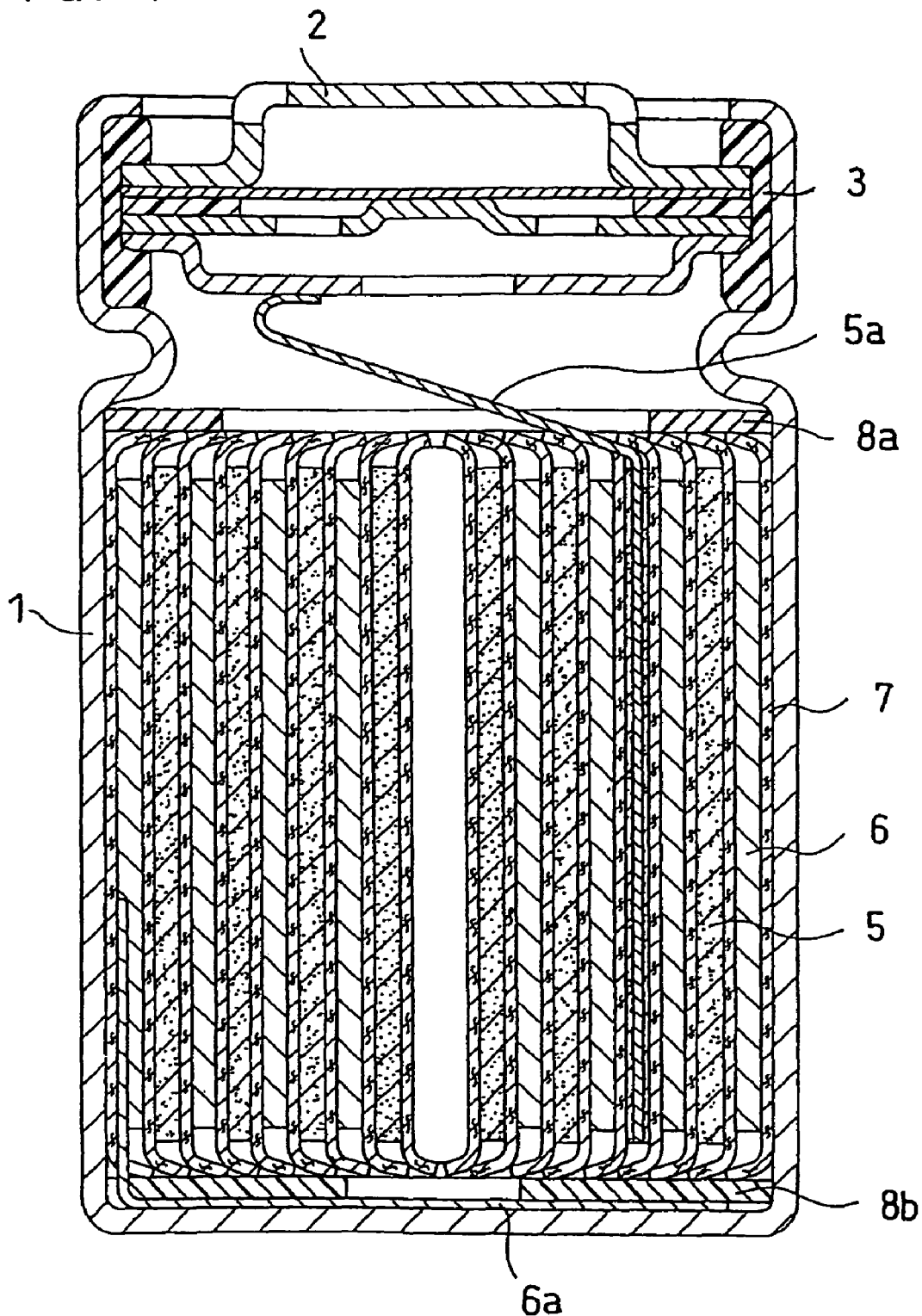
FIG. 1 is a longitudinal sectional view of an exemplary cylindrical lithium ion secondary battery.

The shape and form of the lithium ion secondary battery according to the present invention are not particularly limited and encompass various types such as cylindrical, rectangular, and layered types. However, the present invention is particularly effective in cylindrical or rectangular batteries with an electrode plate assembly composed of a positive electrode and a negative electrode that are wound together with a separator interposed therebetween.

FIG. 1 is a longitudinal sectional view of an example of a common cylindrical lithium ion secondary battery. A positive electrode 5 and a negative electrode 6 are wound together with a separator 7 interposed therebetween, thereby forming a columnar electrode plate assembly. The positive electrode 5 is connected with one end of a positive electrode lead 5a, while the negative electrode 6 is connected with one end of a negative electrode lead 6a. The electrode plate assembly impregnated with a non-aqueous electrolyte is placed in the space inside a battery can 1 while being sandwiched between an upper insulating ring 8a and a lower insulating ring 8b. The separator is interposed between the electrode plate assembly and the inner face of the battery can 1. The other end of the positive electrode lead 5a is welded to the backside of a battery lid 2, while the other end of the negative electrode lead 6a is welded to the inner bottom face of the battery can 1. The opening of the battery can 1 is closed with the battery lid 2 around which an insulating packing 3 is fitted.

Although not shown in FIG. 1, an electronically insulating porous film is bonded to a surface of at least one of the positive electrode and the negative electrode. The porous film contains a particulate filler and a film binder. In the event that an internal short-circuit occurs and the separator shrinks due to a large amount of heat, the porous film performs the function of insulating the electrode plates instead of the separator. It should be understood that FIG. 1 shows merely one mode of the lithium ion secondary battery of the present invention, and that the applicable range of the present invention is not limited to only the one as shown in FIG. 1.

The positive electrode comprises a positive electrode substrate and a positive electrode material mixture layer carried thereon. The positive electrode substrate is preferably aluminum foil or the like. The positive electrode material mixture layer usually contains a positive electrode active material, a positive electrode binder, and a conductive agent. The negative electrode comprises a negative electrode substrate and a negative electrode material mixture layer carried thereon. The negative electrode substrate is preferably copper foil, nickel foil, or the like. The negative electrode mixture layer usually contains a negative electrode active material and a negative electrode binder.

In the present invention, the film binder of the porous film contains a thermo-cross-linkable resin or a cured resin thereof. As used herein, the thermo-cross-linkable resin refers to a resin whose cross-linking reaction proceeds when heated without the use of a cross-linking agent. The cross-linking agent as used herein is, for example, a silane coupling agent, a titanium coupling agent, urea formalin resin, methylol melamine resin, glyoxal, tannic acid, etc.

The thermo-cross-linkable resin is substantially capable of dissolving in a dispersion medium before it is heated; however, after it is heated, it is difficult to be dissolved in a dispersion medium or an electrolyte since the cross-linking reaction proceeds. It should be noted that in the instant specification, the thermo-cross-linkable resin may also be referred to as thermo-setting resin. Also, "curing" as used herein refers to cross-linking, and a thermo-cross-linkable resin that has cross-linked is also referred to as a cured resin. The solubility of the thermo-cross-linkable resin that has cross-linked by heating (cured resin) into the electrolyte (the weight ratio of the part of the cured resin which is to be dissolved in the electrolyte) is preferably 5% by weight or less.

In order to provide the thermo-cross-linkable resin with the above-mentioned characteristics, the thermo-cross-linkable resin preferably has a cross-linkable group that is capable of forming a cross-linked structure by heating. Examples of cross-linkable groups include an epoxy group, a hydroxyl group, an N-methylol amide group (N-oxymethylamide group), and an oxazolyl group.

The present invention encompasses the case where the film binder is composed only of a thermo-cross-linkable resin or a cured resin thereof and the case where the film binder comprises a thermo-cross-linkable resin or a cured resin thereof and other resin component(s). However, the ratio of the thermo-cross-linkable resin or cured resin thereof to the total film binder is desirably 50% or more. Examples of other resin components to be contained in the film binder include styrene butadiene rubber (SBR), modified SBR containing an acrylic acid unit or acrylate unit, polyethylene, polytetrafluoroethylene (PTFE), polyvinylidene fluoride (PVDF), tetrafluoroethylene-hexafluoropropylene copolymer (FEP), polyacrylic acid derivatives, and polyacrylonitrile derivatives. They may be used singly or in combination of two or more of them. Among them, polyacrylic acid derivatives and polyacrylonitrile derivatives are particularly preferred. It is preferred that these derivatives contain at least one selected from the group consisting of a methyl acrylate unit, an ethyl acrylate unit, a methyl methacrylate unit, and an ethyl methacrylate unit in addition to the acrylic acid unit or/and the acrylonitrile unit.

Lithium ion secondary batteries can be usually obtained by production methods including the steps of: forming a positive electrode mixture layer on a positive electrode substrate to obtain a positive electrode; forming a negative electrode mixture layer on a negative electrode substrate to obtain a negative electrode; interposing a separator between the positive electrode and the negative electrode to form an electrode plate assembly; and impregnating the electrode plate assembly with a non-aqueous electrolyte. The present invention further performs the step of forming an electronically insulating porous film that is bonded to a surface of at least one of the positive electrode and the negative electrode.

The step of forming an electronically insulating porous film that is bonded to a surface of at least one of the positive electrode and the negative electrode is performed, for example, in the following manner.

First, a porous film paste is prepared. The porous film paste can be prepared by mixing a film binder containing a thermo-cross-linkable resin and a particulate filler with a dispersion medium of the particulate filler. The dispersion medium of the particulate filler used herein is capable of dissolving the thermo-cross-linkable resin. The thermo-cross-linkable resin contained in the porous film paste is preferably 1 to 10 parts by weight, more preferably 3.5 to 10 parts by weight, and particularly preferably 3.5 to 5 parts by weight, per 100 parts by weight of the particulate filler. If the content of the thermo-cross-linkable resin is too large, battery performance tends to degrade. If the content of the thermo-cross-linkable resin is too small, the strength of the porous film may become insufficient.

Next, the porous film paste is applied onto a surface of at least one of the positive electrode and the negative electrode, and the resultant applied film is heated. Due to the heating, first, the dispersion medium of the particulate filler evaporates. Then, by heating at a higher temperature, the cross-linking reaction of the thermo-cross-linkable resin proceeds. The resultant porous film has good strength since the thermo-cross-linkable resin is cured. It is preferable to evaporate the dispersion medium at a temperature for a period of time such that the cross-linking reaction of the film binder hardly proceeds, and thereafter to cause the cross-linking reaction of the film binder to proceed.

An electrode comprising an electrode substrate and an electrode material mixture layer carried thereon is prepared, for example, in the following manner.

First, an electrode mixture slurry is prepared. The electrode mixture slurry can be prepared by mixing at least an active material and an electrode binder with a dispersion medium of the active material, and with an optional component such as a conductive agent, if necessary. It is preferred that the amount of the electrode binder to be contained in the electrode mixture slurry be, for example, 1 to 6 parts by weight per 100 parts by weight of the active material.

Next, the electrode mixture slurry is applied onto an electrode substrate, and the resultant applied film is heated. Due to the heating, the dispersion medium of the active material evaporates so that an electrode material mixture layer is formed. The dried applied film of the electrode mixture is preferably roll pressed to adjust the density of the electrode material mixture layer.

Generally, when an electrode plate assembly is impregnated with a non-aqueous electrolyte, a film binder swells with the electrolyte. However, a film binder containing a cured thermo-cross-linkable resin has a cross-linked structure and is therefore unlikely to dissolve into an electrolyte even under severe use conditions at high temperatures. Also, even if the cured thermo-cross-linkable resin is immersed in a non-aqueous electrolyte at 60° C. for 72 hours, the degree of swelling of the cured resin with the non-aqueous electrolyte can be suppressed to 700% or less. When the degree of swelling of the cured resin with the non-aqueous electrolyte is 700% or less, it is possible to obtain a lithium ion secondary battery having extremely good life characteristics. However, if the degree of swelling exceeds 700%, the pore volume effective for ion transfer decreases, so that the ion transfer tends to be impeded. In terms of ensuring sufficient pore volume effective for ion transfer, the degree of swelling is more preferably 600% or less.

The degree of swelling of a cured thermo-cross-linkable resin with a non-aqueous electrolyte can be obtained in the following manner. First, a cured sheet composed only of a thermo-cross-linkable resin is prepared. The apparent volume $V1$ of the cured sheet is determined from the dimensions thereof. Subsequently, the cured sheet is immersed in a predetermined non-aqueous electrolyte at 60° C. for 72 hours. Thereafter, the cured sheet swollen with the electrolyte is taken out, and the volume $V2$ thereof is measured. The degree of swelling (X) can be calculated from the following formula:

$$X(\%) = \{(V2-V1)/V1\} \times 100$$

Polyvinylidene fluoride (PVdF), which has no cross-linked structure, is unlikely to dissolve in an electrolyte. However, since PVdF itself is hard, the use of PVdF as the film binder tends to make the flexibility of the porous film insufficient. Particularly when the positive electrode and the negative electrode are wound together with the separator interposed therebetween, the porous film may become cracked.

The mixing of the particulate filler, the film binder and the dispersion medium or the mixing of the active material, the electrode binder, and the dispersion medium can be preformed, for example, by a common mixer, kneader, or the like. The mixing step is preferably performed at a temperature that is sufficiently lower than the temperature at which the cross-linking reaction of the thermo-cross-linkable resin starts, for example, at 60° C. or lower, in order to prevent the thermo-cross-linkable resin from becoming unstable.

The heating temperature of the applied film is preferably 150° C. or higher. If the heating temperature is too low, the cross-linking reaction does not proceed promptly, thereby resulting in a decrease in the productivity of the lithium ion secondary battery. Also, in terms of ensuring that the electrode characteristics are stable, the step of heating the applied film is preferably performed in an inert gas such as nitrogen or argon.

The dispersion medium of the particulate filler used to prepare the porous film paste is not particularly limited, and examples include N-methyl-2-pyrrolidone (NMP), acetone, cyclohexane, methyl ethyl ketone, and cyclohexanone. They may be used singly or in combination of two or more of them.

The thermo-cross-linkable resin as the film binder is preferably a single-liquid-type resin with a masked cross-linkable site, since it is easy to handle and the cross-linking reaction can be easily controlled. As used herein, "masked cross-linkable site" refers to an active site that is temporarily deactivated by a method such as covering by a molecular chain, or an active site that is produced when molecular structure is changed. When a resin with a masked cross-linkable site is heated to a predetermined temperature, the masked cross-linkable site is activated, so that the cross-linking reaction starts. In the case of using such a single-liquid-type resin, in the preparation step of the porous film paste, the materials being mixed are prevented from becoming excessively thick unlike the use of a cross-linking agent, and the viscosity and the state of dispersion of the paste during storage also become significantly stabilized. Further, the step of applying the porous film paste can also be performed stably.

As used herein, the single-liquid-type resin refers to a curing resin that remains in liquid state even when it is left at a predetermined temperature for a given period of time. The single-liquid-type resin used in the present invention is desirably a stable one such that even when it is mixed with a dispersion medium and left, for example, at 40° C. for 72 hours, its cross-linking reaction proceeds only by 5% or less. The degree of progress of cross-linking reaction can be determined, for example, by differential scanning calorimetry (DSC).

The thermo-cross-linkable resin, particularly single-liquid-type thermo-cross-linkable resin, preferably has a weight-average molecular weight of 3000 or more and 300000 or less. If the weight-average molecular weight is less than 3000, in the porous film paste in which the particulate filler is dispersed, sedimentation of the particulate filler may occur. Also, if the weight-average molecular weight exceeds 300000, the viscosity of the porous film paste may become too high.

The thermo-cross-linkable resin, particularly single-liquid-type thermo-cross-linkable resin, preferably contains a hydrophilic group with a high degree of dissociation in the molecular chain, because of the good balance between the cross-linking characteristics upon heating and the stability of the dispersion state of the particulate filler in the porous film paste. Preferable examples of hydrophilic groups with a high degree of dissociation are groups containing sulfur or phosphorus, such as a sulfuric acid group, a sulfonic acid group, a phosphoric acid group, an acidic phosphoric acid ester group, and a phosphonic acid group (strong acid salt groups), and strong electrolyte groups such as a quaternary ammonium group.

A resin containing a hydrophilic group with a high degree of dissociation can be obtained, for example, by copolymerizing a monomer containing a hydrophilic group with a high degree of dissociation with a monomer capable of copolymerizing therewith. Examples of monomers containing a hydrophilic group with a high degree of dissociation include monomers containing a sulfur-containing strong acid salt group, such as unsaturated organic sulfonate and unsaturated organic sulfate, monomers containing a phosphorus-containing strong acid salt group, such as unsaturated organic phosphate and unsaturated organic phosphonate, and unsaturated monomers containing a quaternary ammonium salt group.

Examples of monomers capable of copolymerizing with a monomer containing a hydrophilic group with a high degree of dissociation include acrylic acid alkyl esters such as methyl acrylate, n-propyl acrylate, isopropyl acrylate, t-butyl acrylate, hexyl acrylate, cyclohexyl acrylate, dodecyl acrylate, and lauryl acrylate; methacrylic acid alkyl esters such as methyl methacrylate, n-propyl methacrylate, isopropyl mathacrylate, t-butyl methacrylate, hexyl methacrylate, cyclohexyl methacrylate, dodecyl methacrylate, and lauryl mathacrylate; alkyl esters of unsaturated polyfunctional carboxylic acid such as dimethyl fumarate, diethyl maleate, and butyl benzyl maleate; unsaturated carboxylic acid esters containing an alkoxy group such as 2-methoxyethyl acrylate and 2-methoxyethyl methacrylate; $\alpha,\beta$-unsaturated nitriles such as acrylonitrile and methacrylonitrile; carboxylic acid vinyl esters such as vinyl acetate and vinyl propionate; halogenated olefins such as vinyl chloride, vinyl fluoride, vinyl bromide, vinylidene chloride, vinylidene fluoride, trifluoroethylene, tetrafluoroethylene, and hexafluoropropylene; vinyl ethers such as methyl vinyl ether, isobutyl vinyl ether, and cetyl vinyl ether; unsaturated carboxylic acids such as maleic acid and itaconic acid, unsaturated carboxylic acid anhydrides such as maleic anhydride and itaconic anhydride, unsaturated carboxamides such as (meth)acrylamide and N,N-dimethyl (meth)acrylamide; $\alpha$-olefins such as ethylene and propylene; vinylidene cyanide. Particularly, copolymers containing an acrylonitrile unit are preferable since it has good balance between flexibility and strength.

The method for copolymerizing a monomer containing a hydrophilic group with a high degree of dissociation with a monomer capable of copolymerizing therewith is not particularly limited, and examples which may be used include solution polymerization, suspension polymerization, and emulsion polymerization. Examples of polymerization initiators used for polymerization include organic peroxides such as lauroyl peroxide, diisopropyl peroxydicarbonate, di-2-ethylhexyl peroxydicarbonate, t-butyl peroxypivalate, and 3,5,5-trimethyl hexanoyl peroxide; azo compounds such as a, $\alpha'$-azobisisobutyronitrile; and persulfates such as ammonium persulfate and potassium persulfate.

The thermo-cross-linkable resin as the film binder is preferably one whose cross-linking reaction proceeds promptly at 100° C. or higher. Thus, the temperature at which the masked cross-linkable site is activated is preferably 100° C. or higher. If the temperature at which the masked cross-linkable site is activated is less than 100° C., it may be difficult to obtain a stable porous film paste. Also, if the temperature at which cross-linking reaction proceeds is too high, such cross-linking reaction may cause electrode materials such as an active material to deteriorate. Thus, the temperature at which the cross-linkable site is activated is preferably 220° C. or lower. The temperature at which the cross-linkable site is activated can be defined, for example, as the peak temperature of the endothermic peak by differential scanning calorimetry (DSC).

The thermo-cross-linkable resin desirably contains a polyacrylonitrile chain. This is because a resin containing a polyacrylonitrile chain is excellent in the balance between flexibility and strength. For example, near the center of a columnar electrode plate assembly, the electrode plates form a cylinder whose radius is very small, usually approximately 0.5 to 1.5 mm. Thus, the porous film bonded to the electrode plate surface is also subjected to the same degree of bending. Therefore, it is desired to form a porous film with excellent flexibility that will not become damaged even if it is subjected to such bending.

The particulate filler used in the porous film is desirably electrochemically stable in the operating environment of lithium ion secondary batteries. Also, the particulate filler is desirably a material that is suited for preparing the porous film paste.

The BET specific surface area of the particulate filler is, for example, 0.9 $m^2$/g or more, preferably 1.5 $m^2$/g or more. Also, in terms of suppressing agglomeration of the particulate filler and optimizing the fluidity of the porous film paste, the BET specific surface area is preferably not too large, for example, 150 $m^2$/g or less. Also, the mean particle size (number basis median diameter) of the particulate filler is preferably 0.1 to 5 μm.

In view of the above, the particulate filler is preferably an inorganic oxide and, for example, alumina (aluminum oxide), titania (titanium oxide), zirconia (zirconium oxide), talc, silica rock, magnesia (magnesium oxide), etc. can be preferably used. Particularly, the use of α-alumina and magnesia is preferred.

The positive electrode active material is preferably a composite lithium oxide. Preferable composite lithium oxides include lithium cobaltate ($LiCoO_2$), modified lithium cobaltate, lithium nickelate ($LiNiO_2$), modified lithium nickelate, lithium manganate ($LiMn_2O_4$), modified lithium manganate, and such oxides in which a part of Co, Mn or Ni is replaced with another transition metal element. These modified oxides preferably contain an element such as aluminum or magnesium. Also, they may contain at least two of cobalt, nickel, and manganese. Lithium-containing Mn group transition metal oxides such as $LiMn_2O_4$ are advantageous in that they are abundant on the Earth and therefore low-priced.

The negative electrode active materials which may be used include carbon materials such as various natural graphites, various artificial graphites, petroleum coke, carbon fiber, and baked organic polymers, oxides, silicon-containing composite materials such as silicide, various metals and alloy materials.

The positive electrode material mixture layer and the negative electrode material mixture layer may contain a conductive agent. As the conductive agent, acetylene black, ketjen black (registered trademark), and various graphites, etc. may be used. They may be used singly or in combination of two or more of them.

With respect to the electrode binder, various resin materials may be used.

The positive electrode binder may be, for example, polytetrafluoroethylene (PTFE), polyacrylic acid derivative rubber particles ("BM-500B (trade name)" available from Zeon Corporation), polyvinylidene fluoride (PVdF), etc. PTFE and BM-500B are preferably used in combination with carboxymethyl cellulose (CMC), polyethylene oxide (PEO), modified acrylonitrile rubber ("BM-720H (trade name)" available from Zeon Corporation), etc., which serve as the thickener of the raw material paste of the positive electrode material mixture layer. PVdF has the function as the positive electrode binder and the function as the thickener even when used singly.

The negative electrode binder is preferably a rubber-like polymer, although the same materials exemplified as the positive electrode binder may also be used. The rubber-like polymer preferably contains a styrene unit and a butadiene unit. For example, styrene-butadiene copolymer (SBR) and modified SBR may be used, but there is no limitation. These rubber-like polymers are preferably in particle form. A particulate rubber-like polymer can bond active material particles together by point-bonding. It is thus possible to obtain a negative electrode material mixture layer with high porosity and excellent lithium-ion acceptance. When the negative electrode binder is used in combination with a negative electrode thickener, the negative electrode thickener is preferably a water-soluble polymer. Among water-soluble polymers, cellulose-type resins are preferable, and carboxymethyl cellulose (CMC) is particularly preferable.

The non-aqueous electrolyte preferably comprises a non-aqueous solvent and a lithium salt that is dissolved therein as the solute. The lithium salt is not particularly limited, but the use of lithium hexafluorophosphate ($LiPF_6$), lithium perchlorate ($LiClO_4$), lithium tetrafluoroborate ($LiBF_4$), or the like is preferred. Also, the non-aqueous solvent is not particularly limited, but the use of, for example, ethylene carbonate (EC), propylene carbonate (PC), dimethyl carbonate (DMC), diethyl carbonate (DEC), and methyl ethyl carbonate (MEC) is preferred. While these non-aqueous solvents may be used singly, the use of two or more of them in combination is preferable and the use of at least a carbonic acid ester is preferable. The concentration of the solute dissolved in the non-aqueous solvent is usually 0.5 to 2 mol/L.

In order to improve battery stability upon overcharge, the non-aqueous electrolyte is preferably mixed with an additive that will form a good applied film on the electrode plate. Such additives which may be used include vinylene carbonate (VC), cyclohexyl benzene (CHB), and modified VC and CHB.

The separator is not particularly limited if it is made of a material that is resistant to the operating environment of lithium ion secondary batteries. A microporous sheet composed of polyolefin resin is commonly used as the separator. Examples of polyolefin resin include polyethylene and polypropylene. The microporous sheet may be a mono-layer film containing one kind of polyolefin resin or may be a multi-layer film containing two or more kinds of polyolefin resins. The separator preferably has a thickness of 8 to 30 μm.

The present invention is hereinafter described more specifically by way of Examples, but the present invention is not limited to the following Examples.

EXAMPLES

First, the evaluation method employed in the following Examples and Comparative Examples is described below.

(Short-Circuit Defective Rate)

The electrical resistance between the positive electrode and the negative electrode of a predetermined columnar electrode plate assembly was measured with a resistance meter (tester). When the electrode plate assembly has a resistance value of 30 MΩ or more, it was judged good, and when the electrode plate assembly has a resistance value of less than 30 MΩ, it was judged defective. One hundred electrode plate assemblies of the same kind were fabricated and the number "n" of defective ones was counted.

(Flexibility of Porous Film)

An electrode with a porous film bonded to the surface of the electrode material mixture layer were wrapped around a fixed 1.5-mm-radius (3 mmφ) round bar one turn such that the porous film was positioned outward, and the ends of the electrode were secured at one point. A vertical load of 300 g was applied downward to the secured ends of the electrode. In this state, the surface of the porous film being bent was observed with a microscope with a magnification of 100 times. When the porous film had no cracks, it was expressed as "○", and when it had micro-cracks, it was expressed as "NG".

(Rate of Viscosity Change of Porous Film Paste)

A porous film paste just prepared was allowed to stand at 25° C. for 2 hours, and the viscosity of the porous film paste at 25° C. was measured with a B-type rotation viscometer (the number of revolutions: 30 rpm, cone: 4). Subsequent to the measurement of the viscosity after the 2-hour standby, the porous film paste was allowed to stand at 25° C. for 3 days, and thereafter the viscosity of the porous film paste at 25° C. was measured in the same manner as the above. The rate of change of the latter viscosity relative to the former viscosity was obtained.

(Capacity Retention Rate After 500 Cycles)

A completed battery was preliminarily charged and discharged twice and stored in a 45° C. environment for 7 days. Thereafter, in a 20° C. environment, the following charge/discharge pattern was repeated 500 times. The ratio of the discharge capacity at the 500th cycle to the initial discharge capacity was obtained as the capacity retention rate.

Constant current charge: 1400 mA (cut-off voltage 4.2 V)
Constant voltage charge: 4.2 V (cut-off current 100 mA)
Constant current discharge: 400 mA (cut-off voltage 3 V)

(Degree of Swelling)

A 50-μm-thick sheet composed only of a predetermined binder (in the case of a cross-linkable binder, a cured sheet) is prepared, and the apparent volume V1 of the sheet or cured sheet was obtained. Subsequently, the sheet or cured sheet was immersed in the following non-aqueous electrolyte (non-aqueous electrolyte prepared by dissolving $LiPF_6$ at a concentration of 1 mol/L in a solvent mixture of EC, DMC, and MEC in a volume ratio of 2:3:3 and adding 3% by weight of vinylene carbonate (VC)), which was used to prepare the batteries, at 60° C. for 72 hours. Thereafter, the sheet or cured sheet swollen with the electrolyte was taken out and the volume V2 was measured. The degree of swelling (X) was calculated from the following equation:

$$X(\%) = \{(V2-V1)/V1\} \times 100$$

The sheet or cured sheet composed only of a predetermined binder was prepared by a cast method using a N-methyl-2-pyrrolidone (NMP) solution in which the binder is dissolved. In the case of a cross-linkable binder, the sheet obtained by the cast method was cured by heating.

(Measurement of Molecular Weight of Thermo-Cross-Linkable Resin)

The weight-average molecular weight of a thermo-cross-linkable resin used as the film binder was obtained as a polystyrene conversion value by gel permeation chromatography using N-methyl-2-pyrrolidone as the solvent.

(Activation Temperature of Cross-Linkable Site)

A thermo-cross-linkable resin used as the film binder was heated at various temperatures for 24 hours, and the heated thermo-cross-linkable resin was immersed in the electrolyte (non-aqueous electrolyte prepared by dissolving $LiPF_6$ at a concentration of 1 mol/L in a solvent mixture of EC, DMC, and MEC in a volume ratio of 2:3:3 and adding 3% by weight of vinylene carbonate (VC)) at 60° C. for 24 hours, taken out from the electrolyte, and dried. From the weight W1 before the immersion into the electrolyte and the weight W2 after the immersion into the electrolyte and drying, the solubility S was obtained. $S(\%) = 100(W1-W2)/W1$. The temperature at which the solubility S was 5% or less was defined as the activation temperature.

Example 1

(a) Preparation of Positive Electrode

A positive electrode mixture slurry was prepared by stirring 3 kg of lithium cobaltate, 1 kg of PVdF "#1320 (trade name)" available from Kureha Corporation (N-methyl-2-pyrrolidone (NMP) solution containing 12% by weight of PVdF) serving as a positive electrode binder, 90 g of acetylene black, and a suitable amount of NMP with a double-arm kneader. This slurry was applied onto both sides of a 15-μm-thick aluminum foil serving as a positive electrode substrate, dried and roll pressed, to form positive electrode material mixture layers with a density of 3.3 $g/cm^3$. The thickness of the electrode plate comprising the aluminum foil and the positive electrode material mixture layers was adjusted to 160 μm. Thereafter, the electrode plate was slit to a width such that it was capable of being inserted into a battery can for a cylindrical battery (No. 18650), to obtain a positive electrode hoop.

(b) Preparation of Negative Electrode

A negative electrode mixture slurry was prepared by stirring 3 kg of artificial graphite, 150 g of BM-400B available from Zeon Corporation (aqueous dispersion containing 40% by weight of particulate styrene-butadiene rubber) serving as a negative electrode binder, 30 g of CMC as a thickener, and a suitable amount of water with a double-arm kneader. This slurry was applied onto both sides of a 10-μm-thick copper foil serving as a negative electrode substrate, dried and roll pressed, to form negative electrode material mixture layers with a density of 1.4 $g/cm^3$. The thickness of the electrode plate comprising the copper foil and the negative electrode material mixture layers was adjusted to 180 μm. Thereafter, the electrode plate was slit to a width such that it was capable of being inserted into the battery can for a cylindrical battery (No. 18650), to obtain a negative electrode hoop.

(c) Preparation of Porous Film Paste 970 g of α-alumina "AKP50 (trade name)" with a median diameter of 0.3 μm available from Sumitomo Chemical Co., Ltd. serving as a particulate filler, 774 g of an NMP solution containing 8% by weight of a single-liquid-type thermo-cross-linkable acrylonitrile copolymer as a film binder, and a suitable amount of NMP were stirred for 30 minutes with a dissolver serving as a preliminary stirring device. The preliminarily stirred mixture was further stirred by means of a bead mill with an internal volume of 2 liters (KDC-PAILOT-A type available from Shinmaru Enterprises Corporation) with residence time being set to 10 minutes, to prepare a porous film paste having a non-volatile component of 40% by weight. The bead mill is equipped with a disc and designed to stir the content of the mill by the rotation of the disc. As used herein, the residence time is defined as the value obtained by dividing the internal volume of the mill by the flow rate at which the preliminarily stirred mixture is fed into the mill, and corresponds to the dispersion process time.

The thermo-cross-linkable acrylonitrile copolymer used was an acrylonitrile copolymer having a masked cross-linkable site, having an acrylonitrile unit, a dodecyl acrylate unit, and a butadiene mono-oxide unit, and containing a sulfonic acid group as the hydrophilic group with a high degree of dissociation.

The weight-average molecular weight of the acrylonitrile copolymer used was 239000, and even when it was left at 40° C. for 72 hours, its cross-linking reaction proceeded only by 5% by weight or less. Also, the solubility S of the acrylonitrile copolymer that was cured by heating at 170° C. for 24 hours into the electrolyte was 5% by weight or less. Before the heating, this acrylonitrile copolymer completely dissolved in the dispersion medium.

(d) Formation of Porous Film

The porous film paste thus obtained was applied onto the surfaces of the negative electrode material mixture layers and dried at 120° C., whereby dried applied films with a thickness of 10 μm were obtained. Thereafter, the negative electrode with the dried applied films was heated at 170° C. in a nitrogen gas atmosphere for 24 hours to cross-link the single-liquid-type thermo-cross-linkable acrylonitrile copolymer, whereby porous films were completed.

(e) Preparation of Non-Aqueous Electrolyte

A non-aqueous electrolyte was prepared by dissolving $LiPF_6$ at a concentration of 1 mol/L in a solvent mixture containing ethylene carbonate (EC), dimethyl carbonate (DMC), and methyl ethyl carbonate (MEC) in a volume ratio of 2:3:3 and adding 3% by weight of vinylene carbonate (VC).

(f) Fabrication of Battery

Using the above-mentioned positive electrode, negative electrode and non-aqueous electrolyte, a 18650 cylindrical battery was assembled. First, the positive electrode and the negative electrode were cut to a predetermined length. One end of a positive electrode lead was connected to the positive electrode substrate. Also, one end of a negative electrode lead was connected to the negative electrode substrate. Thereafter, the positive electrode and the negative electrode were wound together with a separator comprising a 10-μm-thick polyethylene resin microporous sheet interposed therebetween, to fabricate a columnar electrode plate assembly. The outer face of the electrode plate assembly was covered with the separator. This electrode plate assembly was placed in the space inside the battery can while being sandwiched between an upper insulating ring and a lower insulating ring. Subsequently, 5 g of the above-mentioned non-aqueous electrolyte was injected into the battery can, and the electrode plate assembly was impregnated with the non-aqueous electrolyte in a reduced pressure atmosphere at 133 Pa. The other end of the positive electrode lead was welded to the backside of a battery lid. Also, the other end of the negative electrode lead was welded to the inner bottom face of the battery can. Lastly, the opening of the battery can was closed with the battery lid around which an insulating packing was fitted. In this way, a cylindrical lithium ion secondary battery was completed.

Example 2

The same porous film as that of Example 1 was formed on the surfaces of the positive electrode material mixture layers instead of forming the porous film on the surfaces of the negative electrode material mixture layers. Except for this, in the same manner as in Example 1, a cylindrical lithium ion secondary battery was completed.

Comparative Example 1

A porous film paste was prepared by using a non-cross-linkable acrylonitrile copolymer containing an acrylonitrile unit and a dodecyl acrylate unit and having no cross-linkable site as the film binder, instead of the single-liquid-type thermo-cross-linkable acrylonitrile copolymer. A cylindrical lithium ion secondary battery was completed in the same manner as in Example 1 except for the use of this porous film paste.

Comparative Example 2

A porous film paste was prepared by using polyvinylidene fluoride (PVdF) as the film binder, instead of the single-liquid-type thermo-cross-linkable acrylonitrile copolymer. A cylindrical lithium ion secondary battery was completed in the same manner as in Example 1 except for the use of this porous film paste.

Comparative Example 3

A porous film paste was prepared by using a vinylidene fluoride-hexafluoropropylene copolymer (PVdF-HFP) as the film binder, instead of the single-liquid-type thermo-cross-linkable acrylonitrile copolymer. A cylindrical lithium ion secondary battery was completed in the same manner as in Example 1 except for the use of this porous film paste.

Comparative Example 4

A porous film paste was prepared by using a polyacrylonitrile derivative with an unmasked hydroxyl group as the film binder, instead of the single-liquid-type thermo-cross-linkable acrylonitrile copolymer. The porous film paste contained, as the cross-linking agent, 20 parts by weight of polyisocyanate with an isocyanate group at the terminal per 100 parts by weight of the polyacrylonitrile derivative with an unmasked hydroxyl group. A cylindrical lithium ion secondary battery was completed in the same manner as in Example 1 except for the use of this porous film paste.

Separately, a mixture of 100 parts by weight of the polyacrylonitrile derivative with an unmasked hydroxyl group and 20 parts by weight of the polyisocyanate with an isocyanate group at the terminal was left at 40° C. for 72 hours. As a result, the cross-linking reaction proceeded in the mixture in excess of 5% by weight.

With respect to Examples 1 and 2 and Comparative Examples 1 to 4, the rate of viscosity change of the porous film paste, the flexibility of the porous film, the short-circuit defective rate of the battery, and the capacity retention rate after 500 charge/discharge cycles were evaluated by the above-mentioned methods. Table 1 shows the results.

TABLE 1

|  | Surface to which porous film is bonded | Film binder | Short-circuit defective rate (%) | Flexibility of porous film | Rate of viscosity change of porous film paste (%) | Capacity retention rate after 500 cycles (%) |
|---|---|---|---|---|---|---|
| Example 1 | Negative electrode | Single-liquid-type thermo-cross-linkable PAN | <1 | ○ | <5 | 91 |
| Example 2 | Positive electrode | Single-liquid-type thermo-cross-linkable PAN | <1 | ○ | <5 | 90 |
| Comparative Example 1 | Negative electrode | Non-cross-linkable PAN | <1 | ○ | <5 | 65 |
| Comparative Example 2 | Negative electrode | PVdF | >7 | NG | <5 | 85 |
| Comparative Example 3 | Negative electrode | PVdF-HFP | <1 | ○ | <5 | 63 |
| Comparative Example 4 | Negative electrode | Hydroxyl group containing PAN* + Cross-linking agent | <1 | ○ | >15 | 87 |

PAN: acrylonitrile copolymer
*polyacrylonitrile derivative

In Table 1, in the case of Examples 1 and 2, the short-circuit defective rates and the viscosity change rates of the porous film paste are on a level having no particular problem, and the capacity retention rates (life characteristics) are favorable. On the other hand, in the case of Comparative Examples 1 and 3, the short-circuit defective rates and the viscosity change rate of the porous film paste are on a level having no particular problem, but the capacity retention rates are below a satisfactory level.

In Comparative Example 2 using PVdF, the film binder is hard, the flexibility of the porous film is insufficient, and the short-circuit defective rate is relatively high. In the case of Comparative Example 4 where the cross-linking agent was additionally used, there is no particular problem with respect to the short-circuit defective rate, and the capacity retention rate is also relatively good, but the viscosity change rate of the porous film paste is high, which appears to be impractical in terms of manufacturing process.

Example 3

Porous film pastes were prepared by using single-liquid-type thermo-cross-linkable acrylonitrile copolymers with activation temperatures of cross-linkable site as shown in Table 2 as the film binders, instead of the single-liquid-type thermo-cross-linkable acrylonitrile copolymer with an activation temperature of cross-linkable site of 170° C. or higher. Cylindrical lithium ion secondary batteries were completed in the same manner as in Example 1 except for the use of these porous film pastes.

The activation temperature of cross-linkable site was changed, for example, by changing at least one of the molecular structure of the masking agent that masks the cross-linkable site, the molecular size thereof, the molecular weight of the copolymer, the composition ratio of the monomers, and the like.

With respect to each of the single-liquid-type thermo-cross-linkable acrylonitrile copolymers, the viscosity change rate, the flexibility of the porous film, the short-circuit defective rate of the battery, and the capacity retention rate after the charge/discharge 500 cycles were evaluated by the above-described methods. Table 2 shows the results.

TABLE 2

| Activation temperature of cross-linkable site (° C.) | Rate of viscosity change of porous film paste (%) | Heating atmosphere | Flexibility of porous film | Short-circuit defective rate (%) | Capacity retention rate after 500 cycles (%) |
|---|---|---|---|---|---|
| 170 | <5 | Nitrogen gas | ○ | <1 | 92 |
| 150 | <5 | Nitrogen gas | ○ | <1 | 91 |
| 140 | >10 | Nitrogen gas | ○ | <1 | 85 |
| 120 | >10 | Nitrogen gas | ○ | <1 | 84 |
| 170 | <5 | Air | ○ | <1 | 65 |

Table 2 shows that when the activation temperature of cross-linkable site is 150° C. or higher, the viscosity change rate of the porous film paste is small. This indicates that the activation temperature of cross-linkable site is desirably 150° C. or higher.

It should be noted that a battery produced in the same manner as in Example 1 except that the heating for cross-linking was performed in an air atmosphere exhibited oxidation of the electrode substrate. It is believed that oxidation of the electrode substrates results in an increase in variations in the life characteristics of the batteries. It is therefore preferable that the heating for cross-linking be performed in an inert atmosphere.

Example 4

Porous film pastes were prepared in the same manner as in Example 1 except that the degree of swelling of the single-liquid-type thermo-cross-linkable acrylonitrile copolymer used as the film binder was varied as shown in Table 3. Cylindrical lithium ion secondary batteries were completed in the same manner as in Example 1 except for the use of these porous film pastes.

The degree of swelling of the single-liquid-type thermo-cross-linkable acrylonitrile copolymer was varied by changing the structure or size of the functional group to be introduced into the acrylonitrile copolymer or the number of the functional groups.

The degree of swelling of the cured sheet composed only of each single-liquid-type thermo-cross-linkable acrylonitrile copolymer, and the capacity retention rate after 500 charge/discharge cycles of the battery with the porous film using it were evaluated by the above-mentioned methods. Table 3 shows the results.

Also, a porous film paste was prepared in the same manner as in Example 1 except that the same non-cross-linkable acrylonitrile copolymer having no cross-linkable site as that of Comparative Example 1 was used as the film binder instead of the single-liquid-type thermo-cross-linkable acrylonitrile copolymer. A cylindrical lithium ion secondary battery was completed in the same manner as in Example 1 except for the use of this porous film paste. The degree of swelling of the sheet composed only of the non-cross-linkable acrylonitrile derivative having no cross-linkable site and the capacity retention rate after 500 charge/discharge cycles of the battery with the porous film using it were evaluated by the above-mentioned methods. Table 3 shows the results.

Further, a porous film paste was prepared in the same manner as in Example 1 except that a vinylidene fluoride-hexafluoropropylene copolymer (PVdF-HFP) was used as the film binder instead of the single-liquid-type thermo-cross-linkable acrylonitrile copolymer. A cylindrical lithium ion secondary battery was completed in the same manner as in Example 1 except for the use of this porous film paste. The degree of swelling of the sheet composed only of PVdF-HFP and the capacity retention rate after 500 charge/discharge cycles of the battery with the porous film using it were evaluated by the above-mentioned methods. Table 3 shows the results.

TABLE 3

| Film binder | Degree of swelling (%) | Capacity retention rate after 500 cycles (%) |
| --- | --- | --- |
| Single-liquid-type thermo-cross-linkable PAN A | 700 | 91 |
| Single-liquid-type thermo-cross-linkable PAN B | 500 | 92 |
| Single-liquid-type thermo-cross-linkable PAN C | 400 | 93 |
| Single-liquid-type thermo-cross-linkable PAN D | 900 | 75 |
| Non-cross-linkable PAN | Dissolved | 65 |
| PVdF-HFP | Partially dissolved | 63 |

PAN: acrylonitrile copolymer

Table 3 shows that when the degree of swelling is 700% or less, good life characteristics can be obtained. When the degree of swelling is 900%, the capacity retention rate is slightly low. On the other hand, the combination of acrylonitrile copolymer containing an unmasked hydroxyl group and polyisocyanate, and PVdF-HFP dissolved in the non-aqueous electrolyte, so that their degree of swelling could not be measured.

INDUSTRIAL APPLICABILITY

As described above, the present invention can provide a lithium ion secondary battery having excellent life characteristics with good productivity and stably.

The invention claimed is:

1. A method for producing a lithium ion secondary battery, comprising the steps of:
    forming a positive electrode material mixture layer on a positive electrode substrate to obtain a positive electrode;
    forming a negative electrode material mixture layer on a negative electrode substrate to obtain a negative electrode;
    forming an electronically insulating porous film that is bonded to a surface of at least one of said positive electrode and said negative electrode;
    interposing a separator between said positive electrode and said negative electrode to form an electrode plate assembly, said separator being a microporous sheet composed of polyolefin resin; and
    impregnating said electrode plate assembly with a non aqueous electrolyte,
    wherein said step of forming a porous film comprises the steps of: preparing a porous film paste that contains a film binder comprising a thermo-cross-linkable resin and a particulate filler; applying said porous film paste onto a surface of at least one of said positive electrode and said negative electrode and heating the resultant applied film; and heating said applied film at a temperature of 150° C. or higher,
    said thermo-cross-linkable resin being a single-liquid-type resin with a masked cross-linkable site, and
    said masked cross-linkable site being activated at 100° C. or higher.

2. The method for producing a lithium ion secondary battery in accordance with claim 1, wherein said thermo-crosslinkable resin comprises a polyacrylonitrile chain.

3. The method for producing a lithium ion secondary battery in accordance with claim 1, wherein said step of heating the applied film is performed in an inert gas.

4. The method for producing a lithium ion secondary battery in accordance with claim 1, wherein said microporous sheet is not bonded to the surface of said positive electrode and said negative electrode.

* * * * *

UNITED STATES PATENT AND TRADEMARK OFFICE
CERTIFICATE OF CORRECTION

PATENT NO. : 7,816,038 B2
APPLICATION NO. : 11/578964
DATED : October 19, 2010
INVENTOR(S) : Tsumoru Ohata et al.

Page 1 of 1

It is certified that error appears in the above-identified patent and that said Letters Patent is hereby corrected as shown below:

ON THE TITLE PAGE:

In Item "(73) Assignee", add --Zeon Corporation, Tokyo, (JP)--

Signed and Sealed this
Twenty-fourth Day of May, 2011

David J. Kappos
*Director of the United States Patent and Trademark Office*